United States Patent
Yang et al.

(10) Patent No.: US 10,598,959 B1
(45) Date of Patent: Mar. 24, 2020

(54) EYEWEAR LENS ATTACHMENT SYSTEM

(71) Applicant: AMAZON TECHNOLOGIES, INC., Seattle, WA (US)

(72) Inventors: Jung Sik Yang, Cupertino, CA (US); Eliot Kim, Los Gatos, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/386,304

(22) Filed: Dec. 21, 2016

(51) Int. Cl.
| | |
|---|---|
| *G02C 1/02* | (2006.01) |
| *G02C 11/00* | (2006.01) |
| *G02C 5/02* | (2006.01) |
| *G02C 1/08* | (2006.01) |
| *G02B 27/01* | (2006.01) |

(52) U.S. Cl.
CPC .......... *G02C 11/10* (2013.01); *G02B 27/0176* (2013.01); *G02C 1/08* (2013.01); *G02C 5/02* (2013.01); *G02B 2027/0178* (2013.01)

(58) Field of Classification Search
CPC ........ G02C 11/10; G02C 7/083; G02C 7/081; G02C 7/12; G02C 7/024
USPC .......................................................... 351/158
See application file for complete search history.

(56) References Cited

U.S. PATENT DOCUMENTS 9,482,880 B1 * 11/2016 Chandrasekhar ...... G02C 7/101
9,482,882 B1    11/2016 Hanover et al.

* cited by examiner

*Primary Examiner* — Hung X Dang
(74) *Attorney, Agent, or Firm* — Lindauer Law, PLLC (57) ABSTRACT

Lenses may be mounted to eyewear using several techniques. A first technique involves the use of a lens unit that is mounted to a frame at a frame bridge. The lens unit includes a lens frame split proximate to the frame bridge, allowing the frame to be opened and a lens inserted. A second technique involves a mechanical interference arrangement that allows a lens to be inserted into, and retained by, a frame groove in a front frame. An inner cover may then be affixed to the front frame to enclose electronics in the front frame.

20 Claims, 10 Drawing Sheets

EYEWEAR LENS ATTACHMENT SYSTEM

BACKGROUND

Wearable devices provide many benefits to users, allowing easier and more convenient access to information and services.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations, the scale or a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor similar to eyeglasses may provide a ubiquitous and easily worn device that facilitates access to information. The HMWD may include lenses. These lenses may provide refractive correction of light passing from the environment to the eye of the user. For example, lenses that provide a particular optical prescription may correct the nearsightedness of the user. Lenses may provide protection from illumination or physical insult. For example, the lenses may be tinted to protect the eyes of the user from glare, or may provide physical protection, stopping foreign particles from hitting the eyes of the user. Lenses may also be used for aesthetic reasons. These lenses may be mounted to the HMWD using one or more of the techniques described herein. Lenses may need to be changed to allow for changes in prescription, protective requirements, aesthetics, and so forth. Described in this disclosure are devices and techniques that allow for lenses to be attached or otherwise physically retained with respect to the rest of a HMWD.

In a first implementation, the HMWD may utilize a configuration in which a front frame is connected to a lens unit. Lenses are affixed to the lens unit. The connection between the front frame and the lens unit may be made at a laterally central area, such as a bridge that would be proximate to the bridge of a user's nose during normal wear. The lens unit may include lens frames that are configured to extend around the perimeter of a lens, when the lens is mounted. The lens frame may include a split or separation that is proximate to the bridge. This separation allows the lens frame to be temporarily opened and a lens inserted or removed. The lens frame may then be closed, such as with a screw, retaining the lens therein. The lens may include an edge groove that is sized to accept the lens frame. Once the lens frame is closed, the lens frame rests at least partially within the edge groove, securing the lens within the lens frame. The bridge of the lens unit may include a cutout or other passage to provide clearance for a sensor. For example, an air conduction (AC) microphone may be emplaced within a bridge of the HMWD. The cutout allows room for the placement of the AC microphone in the bridge. Additional components such as a bridge cover and a nosepiece may be used to complete the lens unit. Fasteners, adhesives, and so forth, may be used to affix the lens unit to the front frame.

In a second implementation, the HMWD may utilize a configuration in which the front frame provides integral support to retain the lenses. The front frame is designed to extend around the lenses, providing a lens cavity within which the lenses may be inserted. The lenses are retained within the lens cavity by engagement with a frame groove. For example, the frame groove may extend around the perimeter of the lens cavity, sized such that the end of the lenses will fit therein. The lens may be snapped into the frame groove during assembly, with a slight flex afforded by the front frame allowing insertion.

The front frame may include various spaces, such as a channel which provides a communicating passage from a left side of the front frame to the right side of the front frame. A flexible printed circuit (FPC) may be emplaced within the channel during assembly to provide electrical connectivity between a left and right temple of the HMWD. The front frame may include a sensor cavity within the bridge. The sensor cavity may have a communicating passage to the channel. The FPC may extend through this communicating passage into the sensor cavity to provide connectivity to the sensor(s) therein. In one implementation, the sensor cavity may be configured to contain an air conduction (AC) microphone.

During assembly, an inner cover may be emplaced on an interior side of the front frame. The inner cover may include alignment features, engagement features, and so forth, that allow the front frame and the inner cover to be joined. The inner cover may include an AC microphone port which is a hole that allows vibrations in the ambient air to pass to the AC microphone located within the sensor cavity.

By using the techniques and devices described herein, the lenses may be easily installed to, or removed from, the HMWD. Such installation or removal may be performed without damaging the HMWD. Relative to other lens mounting techniques, those described herein allow for mounting options not previously known. Additionally, these techniques and devices allow for the device to include electronics without adversely impacting lens attachment.

The front frame may be fabricated from a plastic using injection molding techniques. In one implementation, the fabrication of the front frame may utilize a collapsible insert that, during fabrication, is used to form the frame groove. By using this technique, the front frame may be formed from a single piece of material and include the edges of the groove that are used to retain the lens within the front frame. This allows for reduced production costs compared to computer numerical control (CNC) machining or other production techniques that may be used to produce the front frame.

Illustrative System

Figure 1:
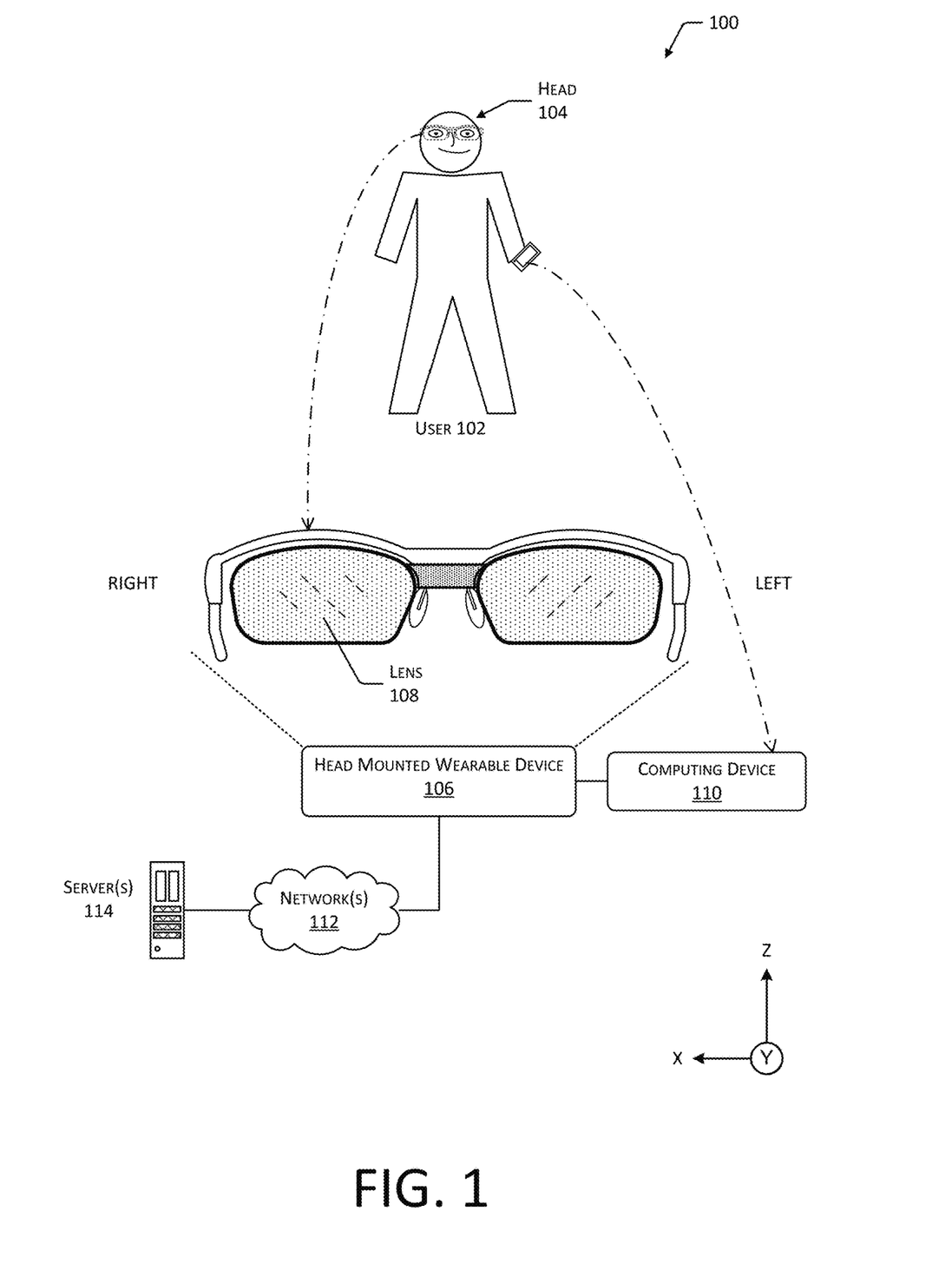
FIG. 1 depicts a system including a head-mounted wearable device equipped with lenses, according to some implementations.

FIG. 1 depicts a system 100 in which a user 102 is wearing on their head 104 a head mounted wearable device (HMWD) 106 in a general form factor of eyeglasses. The HMWD 106 may include one or more lenses 108. The lenses 108 may be shaped to provide a particular refractive effect on light rays. For example, the lenses 108 may be shaped pursuant to a prescription for refractive correction produced by an optometrist. The lenses 108 may provide no refractive correction, such as "plano" lenses. The lenses 108 may include a tint, coloring, photochromic material, coating, and so forth. For example, the lenses 108 may be tinted to protect the eyes of the user 102 from ultraviolet light. The lenses 108 may provide protection to the eyes of the user 102 from foreign objects. For example, the lenses 108 may act as safety glasses. The lenses 108 may provide other functionality as well. For example, the lenses 108 may act as a surface onto which an image may be presented from an electronic display. In some situations, the lenses 108 may provide several functions simultaneously. For example, the lenses 108 may comprise a material strong enough to be suitable for safety glasses, be shaped to provide a particular refractive correction customized for the user 102, and may be tinted to the intensity of light to the user's 102 eyes.

The lenses 108 may need to be installed, changed, or otherwise installed and removed from the HMWD 106. For example, after purchase of the HMWD 106, an optometrist may need to install custom-made refractive lenses 108 made to the refractive prescription of the user 102. In another example, the user 102 may scratch a lens 108, and may wish to remove and replace the lens 108.

The HMWD 106 may be in communication with one or more affiliated computing devices 110. For example, the HMWD 106 may communicate with the computing device 110 using a personal area network (PAN) such as Bluetooth. The computing device 110 may be used at least in part to provide additional resources, such as access to a network 112, compute resources, storage, display output, and so forth. The computing devices 110 may comprise a smart phone, tablet, local server, in vehicle computer system, and so forth. For example, the computing device 110 may comprise a smart phone that includes a display. The display of the smart phone may be used to present a graphical user interface.

The HMWD 106 may be in communication with the other devices via one or more networks 112. For example, the network 112 may comprise a personal area network, local area network, metropolitan area network, wide area network, and so forth. The HMWD 106 may use the networks 112 to access one or more services that are provided by the other devices. For example, the HMWD 106 may establish communication with one or more servers 114. These one or more servers 114 may provide one or more services, such as automated speech recognition, information retrieval, messaging, and so forth.

The structures depicted in this and the following figures are not necessarily according to scale. Furthermore, the proportionality of one component to another may change with different implementations. In some illustrations, the size of one structure may be exaggerated with respect to another to facilitate illustration, and not necessarily as a limitation.

The objects described herein may be affixed to one another using one or more of mechanical interference fits, fasteners, adhesives, welding, and so forth. The affixation of one object to another, or one portion of an object to another, may be reversible or not. For example, a screw may be designed to allow for the insertion or removal of the screw, while a mechanical interference fit may include a tab that cannot be released once it has been engaged. In another example, mechanical interference fit features may include tabs, grooves, ridges, latches, and so forth. It is understood that these various techniques to fix one object to another may be used in various combinations with one another.

Figure 2:
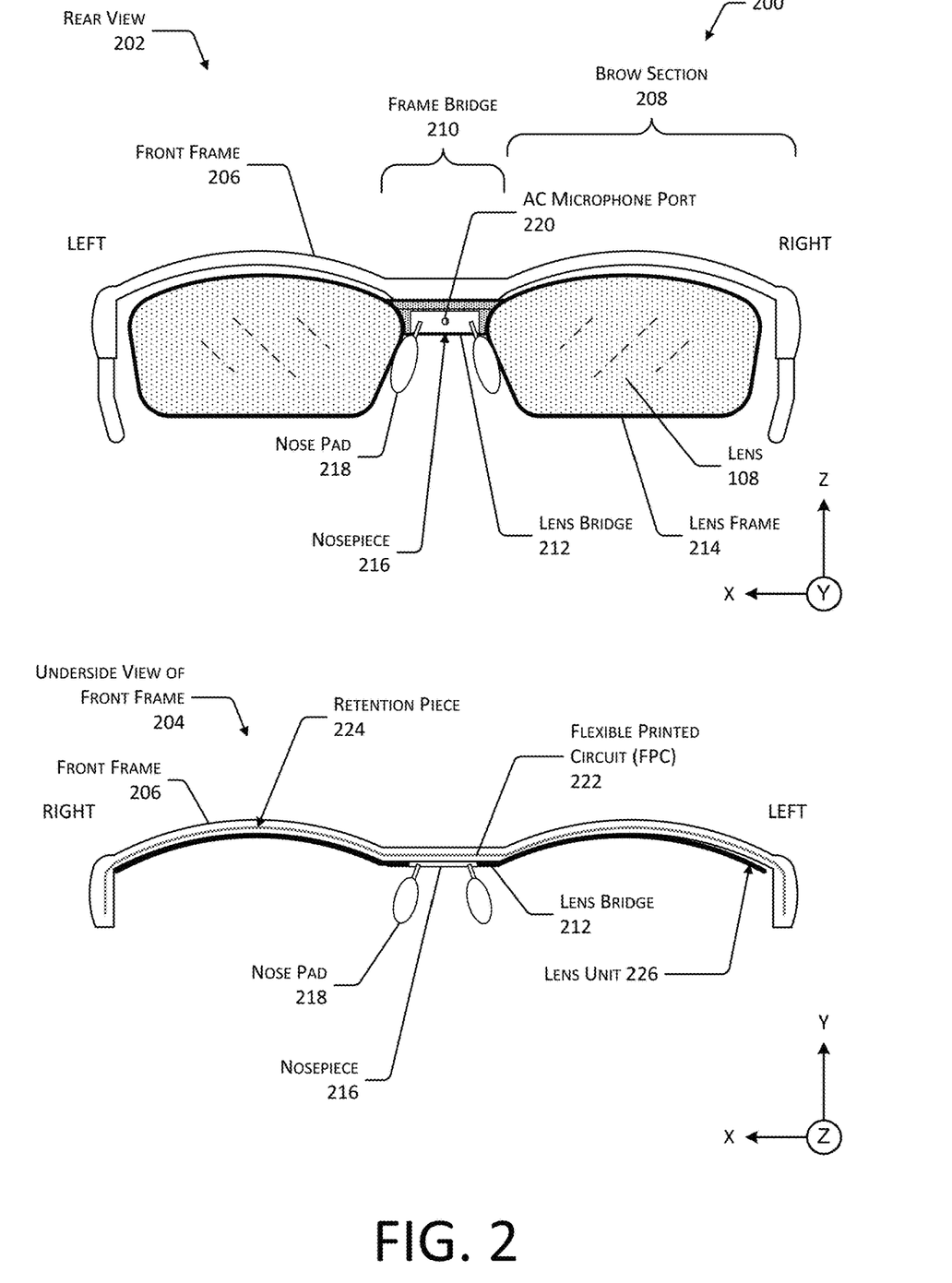
FIG. 2 depicts views of a head-mounted wearable device, according to one implementation.

FIG. 2 depicts views 200 of the HMWD 106, according one implementation. A rear view 202 shows the exterior appearance of the HMWD 106 while an underside view of the front frame 204 shows selected components of the HMWD 106.

In the rear view 202, a front frame 206 is depicted. The front frame 206 may include a left brow section 208(L) and a right brow section 208(R) that are joined by a frame bridge 210. In some implementations, the front frame 206 may comprise a single piece of material, such as a metal, plastic, ceramic, composite material, and so forth. For example, the front frame 206 may comprise 3061 aluminum alloy that has been milled to the desired shape. In another example, the front frame 206 may comprise injection molded plastic. In other implementations, the front frame 206 may comprise several discrete pieces that are joined together by way of mechanical engagement features, welding, adhesive, and so forth.

A lens bridge 212 may be located between the left lens 108(L) and the right lens 108(R). The lens bridge 212 is depicted here as joining a left lens frame 214 and a right lens frame 214.

The lens bridge 212 may be mounted to the frame bridge 210. A nosepiece 216 may be affixed to the lens bridge 212. One or more nose pads 218 may be affixed to, or integral with, the nosepiece 216. The nose pads 218 aid in the support of the front frame 206 and may improve comfort of the user 102.

The nosepiece 216 may include an air conduction (AC) microphone port 220. The AC microphone port 220 may comprise a passageway or hole through the nosepiece 216, that allows sound vibrations to be conveyed to an AC microphone located within the frame bridge 210.

As described above, the lens frames 214 may be used to retain lenses 108. The lenses 108 may have specific refractive characteristics, such as in the case of prescription lenses. The lenses 108 may be clear, tinted, photochromic, electrochromic, and so forth. For example, the lenses 108 may comprise plano (non-prescription) tinted lenses to provide protection from the sun. In some implementations, only a single lens 108 may be installed.

The underside view 204 depicts the front frame 206. One or more electrical conductors, optical fibers, transmission lines, and so forth, may be used to connect various components of the HMWD 106. In this illustration, arranged within a channel is a flexible printed circuit (FPC) 222. The FPC 222 allows for an exchange of electrical signals, optical signals, radio signals, power, and so forth, between devices in the HMWD 106. For example, the FPC 222 may be used to provide connections for electrical power and data communications between electronics in one or both of the temples of the HMWD 106.

A retention piece 224 may be placed between the FPC 222 within the channel and the exterior environment. The retention piece 224 may comprise a single piece or several pieces. The retention piece 224 may comprise an overmolded component, a channel seal, a channel cover, and so forth. For example, the material comprising the retention piece 224 may be formed into the channel while in one or more of a powder, liquid or semi-liquid state. The material may subsequently harden into a solid or semi-solid shape. Hardening may occur as a result of time, application of heat, light, electric current, and so forth. In another example, the retention piece 224 may be affixed to the channel or a portion thereof using adhesive, pressure, and so forth. In yet another example, the retention piece 224 may be formed within the channel using an additive technique, such as using an extrusion head to deposit a plastic or resin within the channel, a laser to sinter a powdered material, and so forth. In still another example, the retention piece 224 may comprise a single piece produced using injection molding techniques. In some implementations, the retention piece 224 may comprise an overmolded piece. The FPC 222 may be maintained within the channel by the retention piece 224. The retention piece 224 may also provide devices within the channel with protection from environmental contaminants such as dust, water, and so forth.

The retention piece 224 may be sized to retain the FPC 222 within the channel. The retention piece 224 may include one or more engagement features. The engagement features may be used to facilitate retention of the retention piece 224 within the channel of the front frame 206. For example, the distal ends of the retention piece 224 may include protrusions configured to engage a corresponding groove or receptacle within a portion of the front frame 206. Instead of, or in addition to the engagement features, an adhesive may be used to bond at least a portion of the retention piece 224 to at least a portion of the channel in the front frame 206.

The retention piece 224 may comprise a single material, or a combination of materials. The material may comprise one or more of an elastomer, a polymer, a ceramic, a metal, a composite material, and so forth. The material of the retention piece 224 may be rigid or elastomeric. For example, the retention piece 224 may comprise a metal or a resin. In implementations where the retention piece 224 is rigid, a retention feature such as a tab or slot may be used to maintain the retention piece 224 in place in the channel of the front frame 206. In another example, the retention piece 224 may comprise a silicone plastic, a room temperature vulcanizing rubber, or other elastomer.

A lens unit 226 may comprise one or more of the lens bridge 212, the lens frames 214, the nosepiece 216, the nose pads 218, or the lenses 108. The lens unit 226 may be joined to the front frame 206. For example, screws may secure the lens bridge 212 to the frame bridge 210.

One or more components of the HMWD 106 may comprise single unitary pieces or may comprise several discrete pieces. For example, the front frame 206, the nosepiece 216, the lens unit 226, and so forth, may comprise a single piece, or may be constructed from several pieces joined or otherwise assembled.

Figure 3:
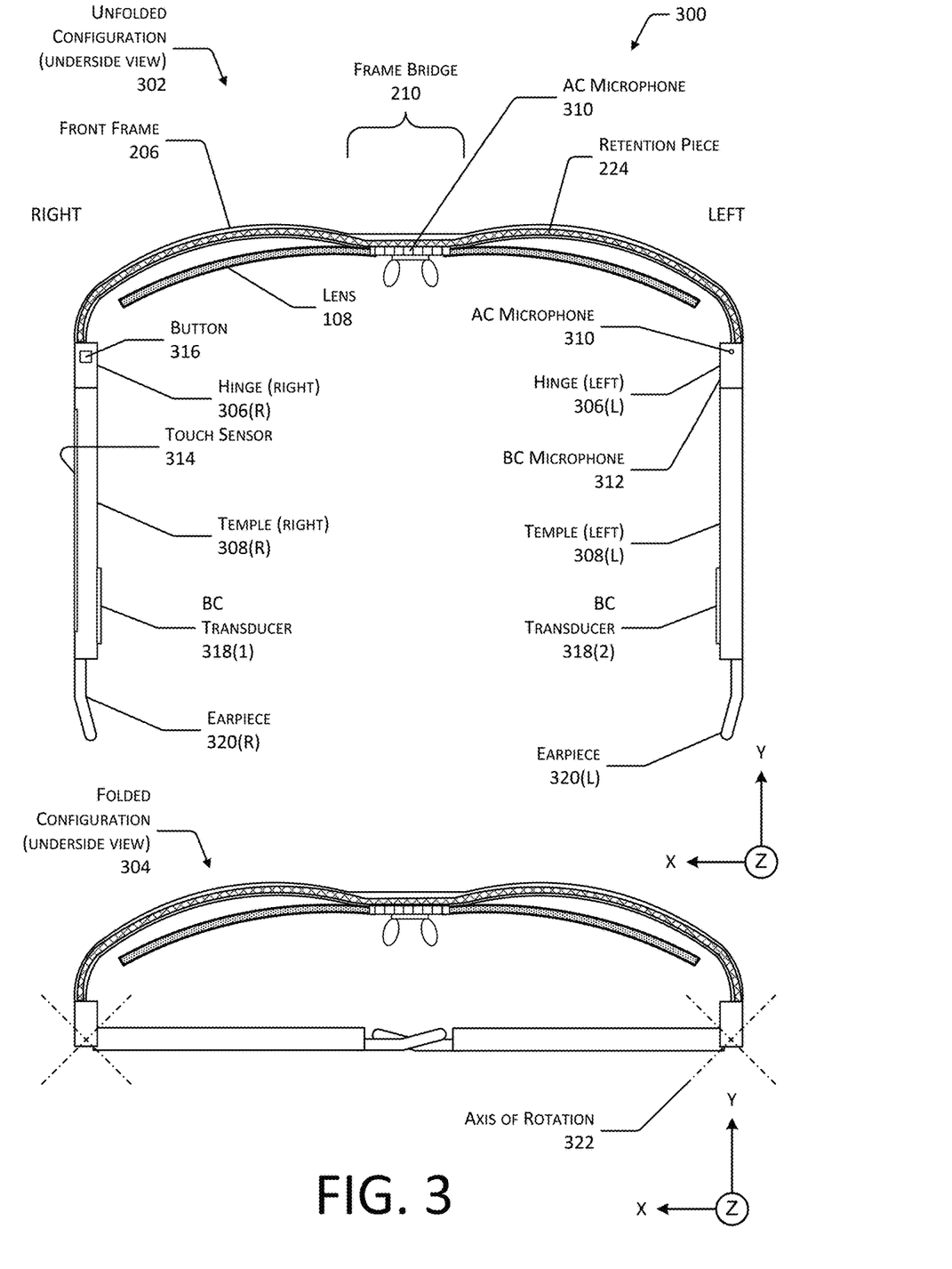
FIG. 3 depicts exterior views, from below, of the head-mounted wearable device in an unfolded and folded configuration, according to one implementation.

FIG. 3 depicts exterior views 300, from below looking up, of the HMWD 106, including a view in an unfolded configuration 302 and a view in a folded configuration 304, according to some implementations. The retention piece 224 that is placed within a channel of the front frame 206 is visible in this view from underneath the HMWD 106.

Also, visible in this view are the lenses 108 of the lens unit 226. Because the lens unit 226 is affixed to the front frame 206 at the frame bridge 210, the front frame 206 may flex without affecting the positioning of the lenses 108 with respect to the eyes of the user 102. For example, when the head 104 of the user 102 is relatively large, the front frame 206 may flex away from the user's head 104 to accommodate the increased distance between the temples. Similarly, when the head 104 of the user 102 is relatively small, the front frame 206 may flex towards the user's head 104 to accommodate the decreased distance between the temples.

One or more hinges 306 may be affixed to, or an integral part of, the front frame 206. Depicted are a left hinge 306(L) and a right hinge 306(R) on the left and right sides of the front frame 206, respectively. The left hinge 306(L) is arranged at the left brow section 208(L), distal to the frame bridge 210. The right hinge 306(R) is arranged at the right brow section 208(R) distal to the frame bridge 210.

A temple 308 may couple to a portion of the hinge 306. For example, the temple 308 may comprise one or more components, such as a knuckle, that mechanically engage one or more corresponding structures on the hinge 306.

The left temple 308(L) is attached to the left hinge 306(L) of the front frame 206. The right temple 308(R) is attached to the right hinge 306(R) of the front frame 206.

The hinge 306 permits rotation of the temple 308 with respect to the hinge 306 about an axis of rotation 322. The hinge 306 may be configured to provide a desired angle of rotation. For example, the hinge 306 may allow for a rotation of between 0 and 120 degrees. As a result of this rotation, the HMWD 106 may be placed into a folded configuration, such as shown at 304. For example, each of the hinges 306 may rotate by about 90 degrees, such as depicted in the folded configuration 304.

One or more of the front frame 206, the hinge 306, or the temple 308 may be configured to dampen the transfer of vibrations between the front frame 206 and the temples 308. For example, the hinge 306 may incorporate vibration dampening structures or materials to attenuate the propagation of vibrations between the front frame 206 and the temples 308. These vibration dampening structures may include elastomeric materials, springs, and so forth. In another example, the portion of the temple 308 that connects to the hinge 306 may comprise an elastomeric material.

One or more different sensors may be placed on the HMWD 106. For example, an AC microphone 310 may be located at the frame bridge 210 while a bone conduction (BC) microphone 312 may be emplaced within or proximate to the left hinge 306(L), such as on the underside of the left hinge 306(L). The BC microphone 312 and the AC microphone 310 are maintained at a fixed distance relative to one another during operation. For example, the relatively rigid frame of the HMWD 106 maintains the spacing between the BC microphone 312 and the AC microphone 310. While the AC microphone 310 is depicted proximate to the frame bridge 210, in other implementations, the BC microphone 312 may be positioned at the frame bridge 210.

The AC microphone 310 may comprise a diaphragm, MEMS element, or other elements that move in response to the displacement of air by sound waves. Air conduction mic data may be generated that is indicative of the sound detected by the AC microphone 310.

The BC microphone 312 is responsive to the vibrations produced by the user 102, such as while speaking. The BC microphone 312 may be arranged to be in contact with the skin above a bony or cartilaginous structure. For example, where the HMWD 106 is in the form of eyeglasses, nose pads 218 of a nosepiece 216 may be mechanically coupled to the BC microphone 312 such that vibrations of the nasal bone, glabella, or other structures upon which the nose pads may rest are transmitted to the BC microphone 312. In other implementations, the BC microphone 312 may be located elsewhere with respect to the HMWD 106, or worn elsewhere by the user 102. For example, the BC microphone 312 may be incorporated into the temple 308 of the HMWD 106, a hat or headband.

A touch sensor 314 may be located on one or more of the temples 308. For example, the touch sensor 314 may comprise a capacitive touch sensor, a force sensitive resistor touch sensor, an optical touch sensor, and so forth. Touch sensor data may be generated that is indicative of the location, direction, duration and so forth of the touch.

One or more buttons 316 may be placed in other locations on the HMWD 106. For example, a button 316(1) may be emplaced within, or proximate to the, right hinge 306(R), such as on an underside of the right hinge 306(R).

One or more bone conduction (BC) transducers 318 may be emplaced on the temples 308. For example, as depicted here, a BC transducer 318 may be located on the surface of the temple 308 that is proximate to the head 104 of the user 102 during use. The BC transducer 318 may be configured to generate acoustic output. For example, the BC transducer 318 may comprise a piezoelectric device that provides audio to the user 102 via bone conduction through the temporal bone of the head 104. In some implementations, the BC transducer 318 may be used to provide the functionality of the BC microphone 312. For example, the BC transducer 318 may be used to detect vibrations of the user's 102 head 104.

An earpiece 320 may extend from a portion of the temple 308 that is distal to the front frame 206. The earpiece 320 may comprise a material that may be reshaped to accommodate the anatomy of the head 104 of the user 102. For example, the earpiece 320 may comprise a thermoplastic that may be warmed to a predetermined temperature and reshaped. In another example, the earpiece 320 may comprise a wire that may be bent to fit. The wire may be encased in an elastomeric material.

Figure 4:
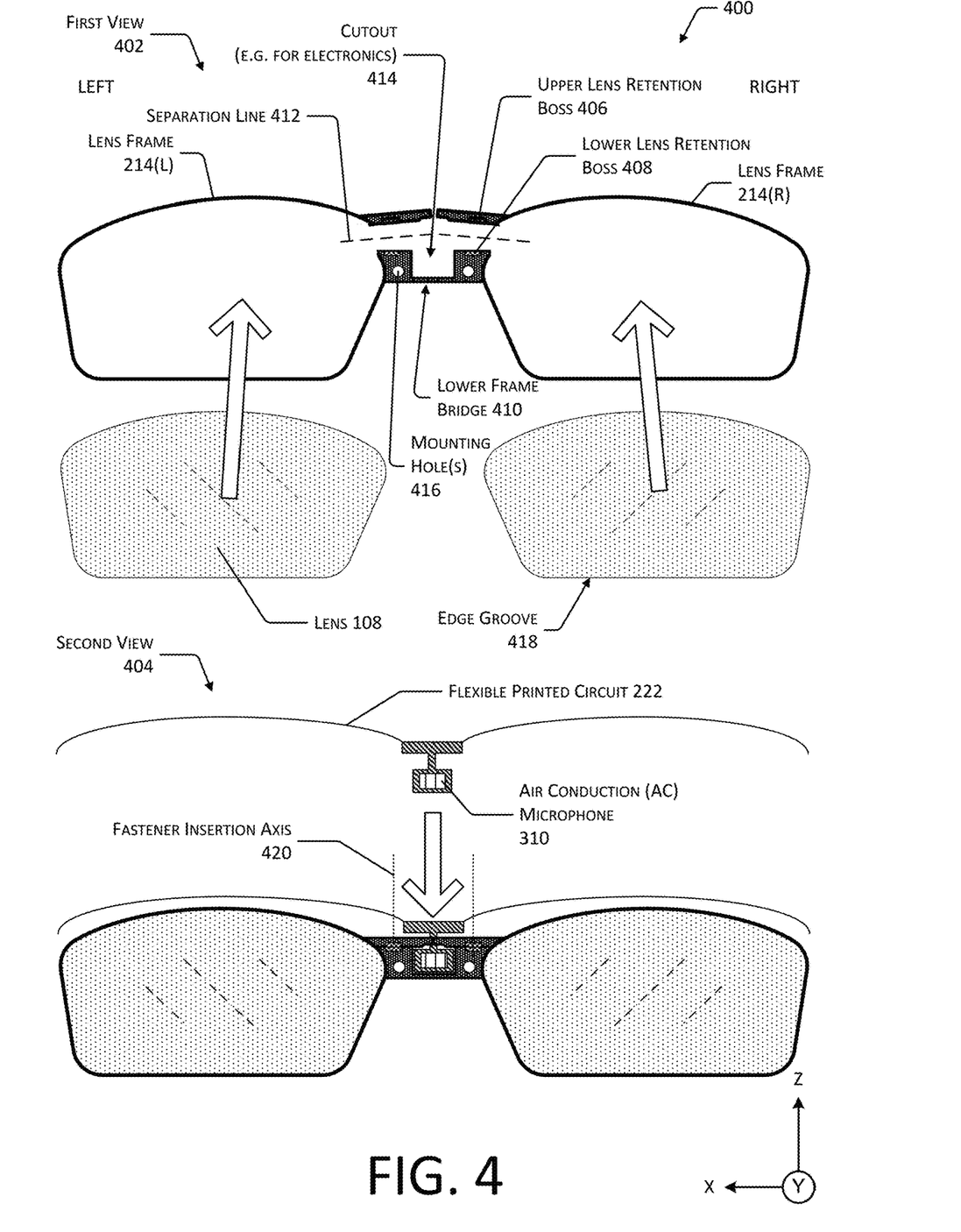
FIG. 4 depicts views of a lens unit that includes a lens frame that may be opened to install lenses, according to one implementation.

FIG. 4 depicts views 400 of a lens unit 226 that includes lens frames 214 that may be opened to install lenses 108, according to one implementation. The views depicted include a first view 402 and a second view 404.

The first view 402 depicts a portion of the lens unit 226 that includes a left lens frame 214(L) and a right lens frame 214(R). The lens frame 214 has two portions. A first portion may include an upper lens retention boss 406, or other retention feature. For example, the upper lens retention boss 406 may comprise a protuberance extending from the lens frame 214. A second portion may include a lower lens retention boss 408, or other retention feature. The lower lens retention boss 408 is affixed to, or part of, a lower frame bridge 410. For example, the lower lens retention boss 408 may comprise a protuberance extending from the lower frame bridge 410.

A boss may comprise a protuberance from a structure, such as a tab that extends from the lens frame 214 or a portion thereof. In the implementation depicted in FIG. 4, the lower lens retention bosses 408 and the upper lens retention bosses 406 are perpendicular to a plane described by the lower frame bridge 410. For example, the bosses may extend along the Y axis as depicted in this figure. In another implementation (not depicted), the bosses may be parallel to the plane described by the lower frame bridge 410, or may be incorporated at least partially therein. For example, the upper lens retention boss 406 may be parallel to the plane of the lower frame bridge 410, and may be such that the retention feature such as a screw hole aligns with the mounting holes. During assembly, the lenses 108 may be inserted, the lens frame 214 may be closed, aligning the hole in the upper lens retention boss 406 with the mounting hole 416. To maintain the lens 108 in the closed configuration, a first fastener is inserted through the left upper lens retention boss 406 and a left mounting hole 416 to secure the left lens 108, while a second fastener is inserted through the right upper lens retention boss 406 and a right mounting hole 416 to secure the right lens 108. The mounting hole 416 may be non-threaded or threaded.

In the first view 402, the lens frames 214 are shown in an open configuration with the upper lens retention boss 406 and the lower lens retention boss 408 separated along respective separation lines 412. In this open configuration, a lens 108 may be inserted into the lens frame 214, or removed from the lens frame 214.

A cutout 414 may be provided within the lower frame bridge 410. The cutout 414 may be cut, formed, or otherwise provided in the lower frame bridge 410. The cutout 414 provides clearance for electronics, such as the AC microphone 310.

The lower frame bridge 410 may include one or more mounting holes 416. The mounting holes 416 may be used to affix the lens unit 226 to the frame bridge 210. For example, screws or other mechanical fasteners may be inserted through the mounting holes 416. In other implementations, instead of or in addition to the mounting holes 416, other engagement features, adhesives, or other techniques may be used to join the lens unit 226 to the frame bridge 210.

The lens 108 may include an edge groove 418. The edge groove 418 may be sized such that at least a portion of the lens frame 214 may be inserted at least partially therein. When the lens 108 is inserted into the lens frame 214 and the upper lens retention boss 406 and the lower lens retention boss 408 are joined, such as by using a screw, the lens 108 is retained in place by the mechanical interference between the edge groove 418 and the lens frame 214.

The second view 404 depicts the FPC 222 with microphone package such as the AC microphone 310 affixed thereto. For example, the FPC 222 may provide electrical power, convey control and output signals, and so forth. The AC microphone 310 may be inserted at least partially through the cutout 414.

Fastener insertion axes 420 are depicted that illustrate the axis along which screws or other fasteners may be inserted to join the upper lens retention boss 406 and the lower lens retention boss 408. When the lens frame 214 is assembled, the left upper lens retention boss 406 is proximate to the left lower lens retention boss 408, while the right upper lens retention boss 406 is proximate to the right lower lens retention boss 408. In one implementation, the upper lens retention boss 406 may be in contact with the corresponding lower lens retention boss 408. In other implementations, a washer, spacer, or gap may be presented between the upper lens retention boss 406 and the lower lens retention boss 408.

The upper lens retention boss 406 or other feature may be configured to join to the lower lens retention boss 408 or other feature. In one implementation, the upper and lower features may have a pair of complementary mechanical interference fit elements. For example, the upper features may include tabs or ridges while the lower features may include slots or grooves that accept portions of the tabs or ridges. In another example, the mechanical interference fit elements may be constructed with sizes such that a tight fit between the two is achieved and friction between the elements retains the elements together. In some implementations, the complementary mechanical interference fit elements may be capable of being detached after assembly. For example, a tab may be designed to be disengaged from a complementary ridge or slot.

In some implementations, the upper features and lower features may comprise portions of the frame that are suitable for adhesion, welding, or other joining techniques. For example, the upper features and the lower features may comprise portions of the frame that may be welded together during assembly, joined using an adhesive, and so forth.

Figure 5:
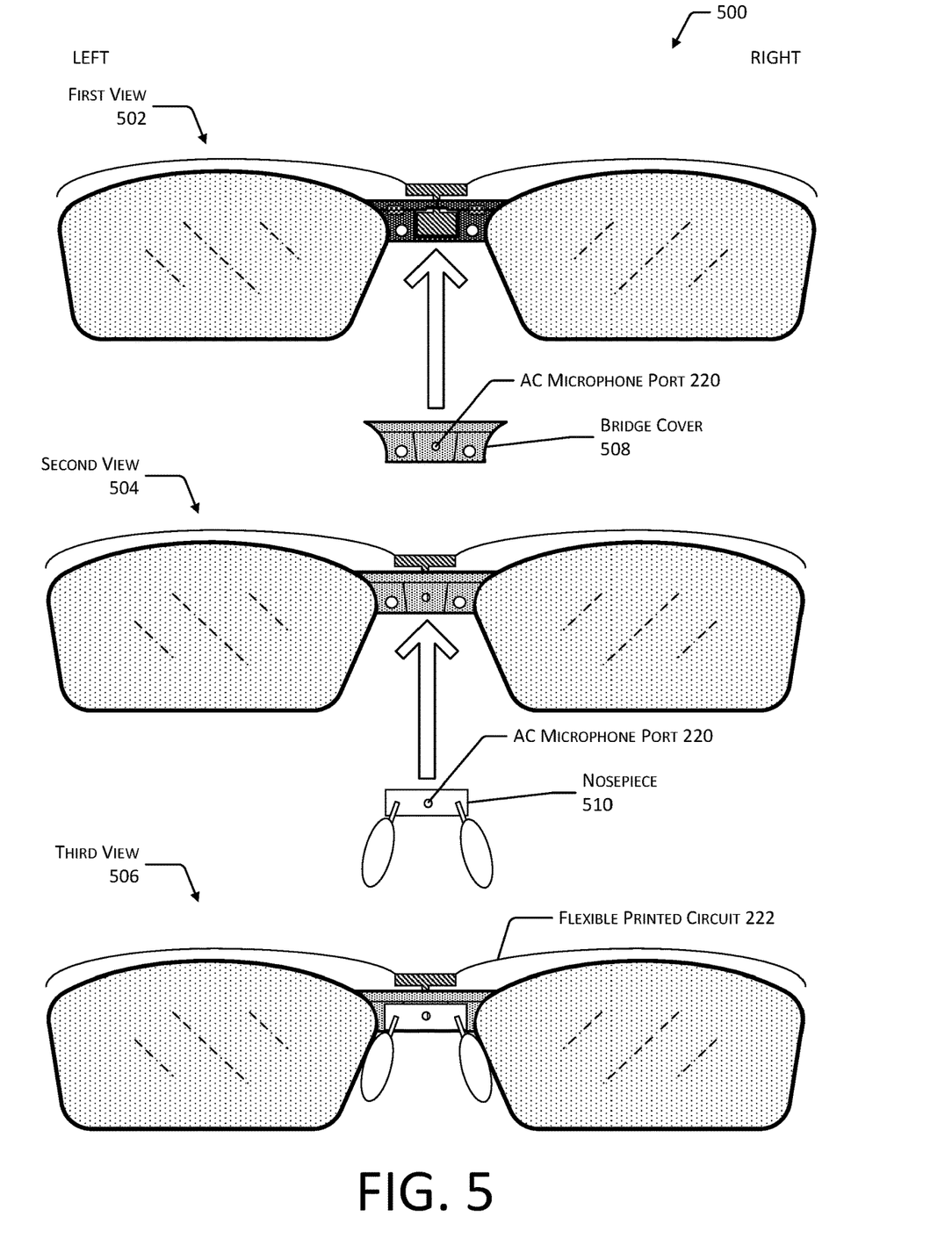
FIG. 5 depicts additional views of the lens unit of FIG. 4 and additional components that may be used in conjunction with the lens frame, according to one implementation.

FIG. 5 depicts additional views 500 of the lens unit 226 of FIG. 4 and additional components that may be used in conjunction with the lens frame 214, according to one implementation. A first view 502, second view 504, and third view 506 depict a portion of the assembly process in which various components are affixed to the lens unit 226.

The first view 502 depicts a bridge cover 508 being placed over a portion of the lens unit 226. For example, the bridge cover 508 may cover the upper lens retention bosses 406 and the lower frame bridge 410. The bridge cover 508 may include an AC microphone port 220. The AC microphone port 220 provides a passageway or hole through which sound vibrations may be communicated to the AC microphone 310.

The lens unit 226 may then be joined to the front frame 206. For example, screws may pass through mounting holes 416 in the bridge cover 508, through the mounting holes 416 of the lower frame bridge 410, and into threaded receptacles within the front frame 206. One or more of a fastener, adhesive, mechanical interference fit, and so forth, may be used to affix the bridge cover 508 to one or more of the lower frame bridge 410 or the front frame 206.

The second view 504 depicts the nosepiece 510 being affixed to the bridge cover 508. For example, one or more of a fastener, adhesive, mechanical interference fit, and so forth, may be used to affix the nosepiece 510 to the bridge cover 508. The nosepiece 510 may also include an AC microphone port 220.

The third view 506 depicts the lens unit 226 with the bridge cover 508 and the nosepiece 510 attached. In this configuration, the mounting holes 416 and the fasteners therein are concealed from the view of the user 102. The FPC 222 is depicted, and may be arranged within a channel or other space within the front frame 206. The front frame 206 is not depicted in this illustration.

Figure 6:
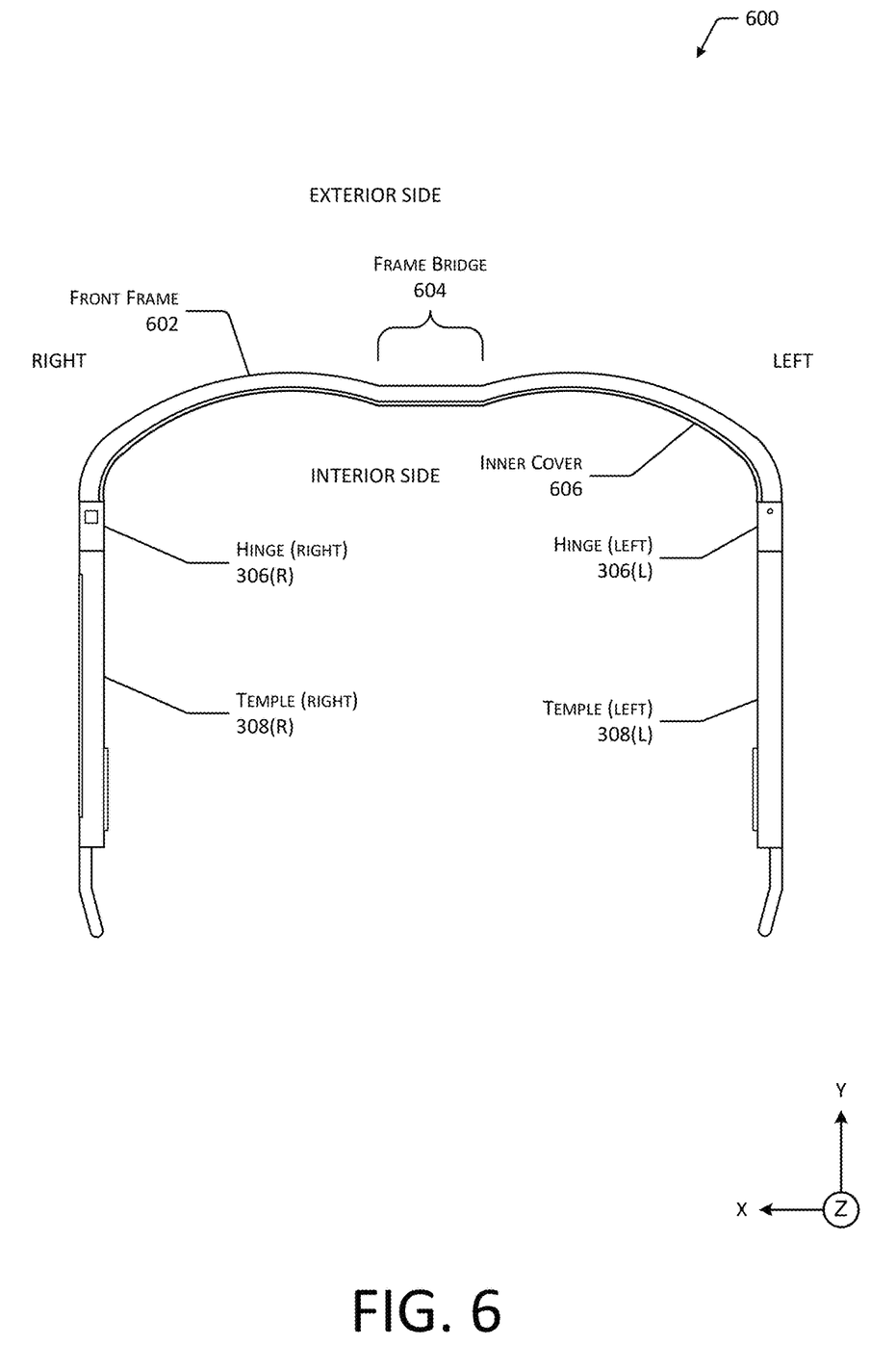
FIG. 6 depicts an exterior view, from below, of the head-mounted wearable device in an unfolded configuration that utilizes an inner cover, according to another implementation.

FIG. 6 depicts an exterior view 600, from below, of the HMWD 106 in an unfolded configuration that utilizes an inner cover, according to another implementation.

In another implementation, the HMWD 106 may utilize a front frame 602 that provides support for one or more of the lenses 108. Similar to the front frame 206 described above, the front frame 602 may include a frame bridge 604 that joins a left brow section and a right brow section.

The front frame 602 may have an interior side that is proximate to the user 102 during normal wear, and an exterior side that is opposite the interior side. The interior side of the front frame 602 may be open, allowing for the assembly of the HMWD 106 by insertion of the FPC 222, sensors such as the AC microphone 310, and so forth, within the front frame 602. Once ready for final assembly, an inner cover 606 may be joined to the interior side of the front frame 602. The inner cover 606 provides concealment and protection for the structures and components within the front frame 602.

Figure 7:
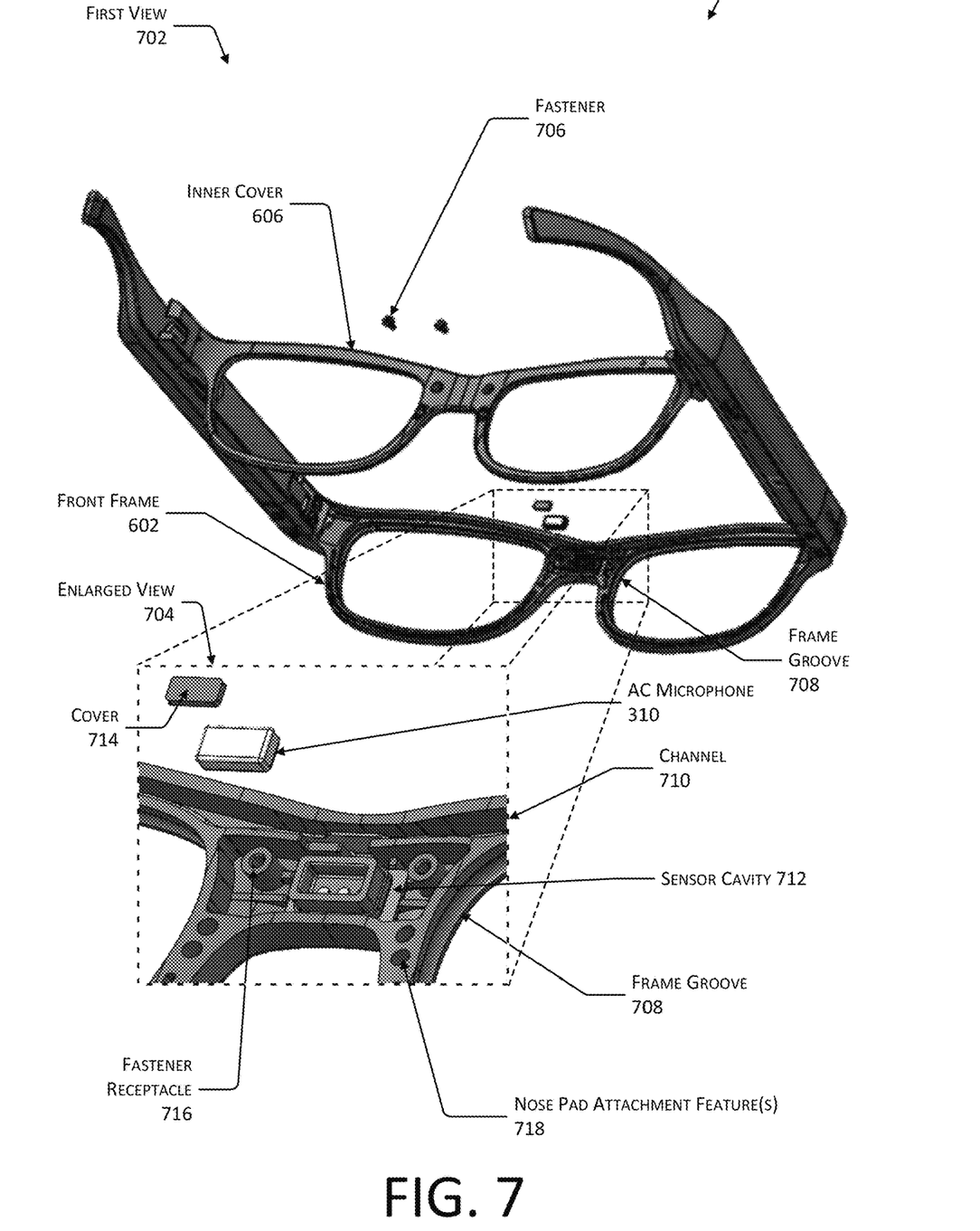
FIG. 7 depicts views of the implementation of FIG. 6, including a front frame and the inner cover.

FIG. 7 depicts views 700 of the implementation of FIG. 6, including a front frame 602 and the inner cover 606. A first view 702 shows a rendering of the front frame 602 prior to the inner cover 606 being joined to the interior side of the front frame 602. An enlarged view 704 provides additional details with regard to the frame bridge 604.

In the first view 702, we see a pair of fasteners 706, such as screws that may be used to join the inner cover 606 to the front frame 602. In addition to, or instead of, the screws other techniques may be used to join the inner cover 606 to the front frame 602. For example, mechanical features such as an engagement slot on the front frame 602 and a corresponding engagement ridge along the inner cover 606, or vice versa, may provide for alignment. An adhesive may be placed in the engagement slot to affix the inner cover 606 to the front frame 602.

Depicted on the front frame 602 are frame grooves 708 for each of the respective lenses 108. In the enlarged view 704, the frame groove 708 for the right lens 108 is visible. The walls of the frame groove 708 provide mechanical interference features that maintain engagement of the lens 108 within the front frame 602. During assembly of the HMWD 106, the lenses 108 may be inserted into the front frame 602 before the inner cover 606 is affixed.

Fabrication of the front frame 602 may utilize injection molding techniques. In one implementation, the front frame 602 may comprise a unitary piece of plastic that is formed using injection molding. To form the edges of the frame groove 708, a collapsible insert may be utilized. During the injection molding process, the collapsible insert is expanded to provide a physical structure against which the plastic may be molded to form the frame groove 708.

Also, depicted within the enlarged view 704 is a channel 710. The channel 710 may provide a passageway through which the FPC 222 may be arranged. The channel 710 may extend from the left hinge 306(L) to the right hinge 306(R).

A sensor cavity 712 may be located within the frame bridge 604 of the front frame 602. The sensor cavity 712 provides a volume within which one or more sensors may be arranged. For example, the AC microphone 310 may be emplaced within the sensor cavity 712. The sensor cavity 712 may be in communication with the channel 710. For example, a passage or an opening may exist between the channel 710 and the sensor cavity 712 that allows the FPC 222 to extend within the sensor cavity 712. The AC microphone 310 may include other components, such as a cover 714. The cover 714 may comprise a piece of cloth, foam, or other material that allows the transmission of sound vibrations while minimizing the impact of wind on the AC microphone 310.

The frame bridge 604 may include one or more fastener receptacles 716. For example, the fastener receptacles 716 may be threaded holes within which a screw may be inserted.

The frame bridge 604 may include one or more nose pad attachment features 718. For example, the nose pad attachment feature 718 may include cavities within which one or more members of the nose pad 218 may be inserted. In some implementations, an adhesive or mechanical interference fit may be used to maintain the nose pad 218 within the nose pad attachment feature 718.

Figure 8:
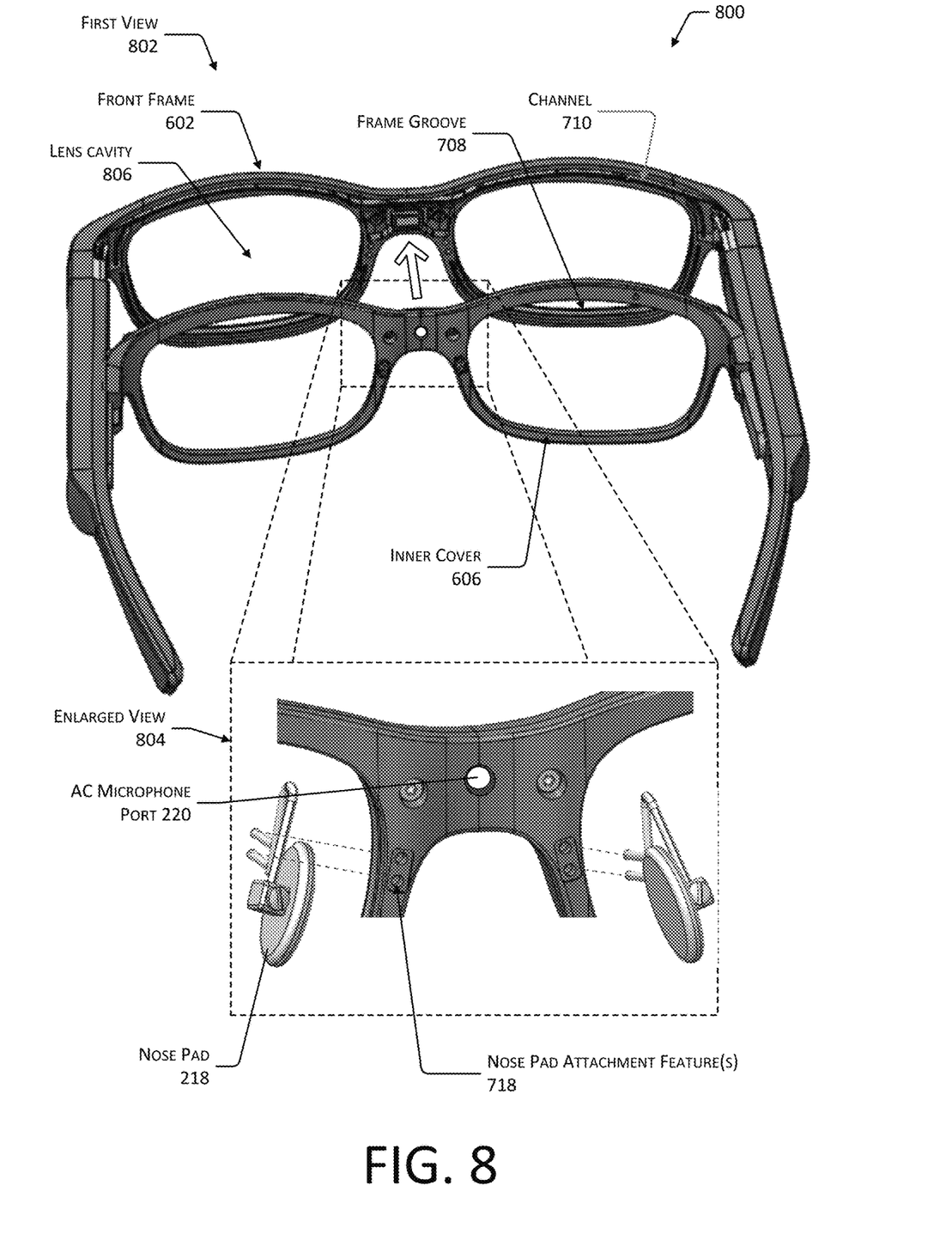
FIG. 8 depicts views of the head-mounted wearable device of FIG. 6, including details of the nose pads, according to one implementation.

FIG. 8 depicts views 800 of the head-mounted wearable device 106 of FIG. 6, including details of nose pads 218 according to one implementation. A first view 802 depicts the front frame 602 and the inner cover 606, while a second view depicts an enlarged view 804 of the frame bridge 604.

As shown in the first view 802, the front frame 602 includes a left lens cavity 806(L) and a right lens cavity 806(R). During assembly of the HMWD 106, the lenses 108 may be inserted into the respective lens cavities 806, such that the edge of each lens 108 engages and is disposed within at least a portion of the frame groove 708 for the lens cavity 806. Also depicted is the channel 710.

In another implementation, not depicted here, a gasket may be arranged between the front frame 602 and the inner cover 606. In some implementations, an adhesive, room temperature vulcanizing rubber, silicone rubber, or other material may be arranged between the front frame 602 and the inner cover 606. This material may be used to join the two pieces as well as to provide a barrier that prevents intrusion of contaminants into the interior of the front frame 602.

The enlarged view 804 shows additional details with respect to the frame bridge 604. In some implementations, the inner cover 606 may include an AC microphone port 220. The inner cover 606 may include one or more nose pad attachment features 718, or holes through which the nose pad 218 may access the nose pad attachment feature 718 present in the front frame 602.

Figure 9:
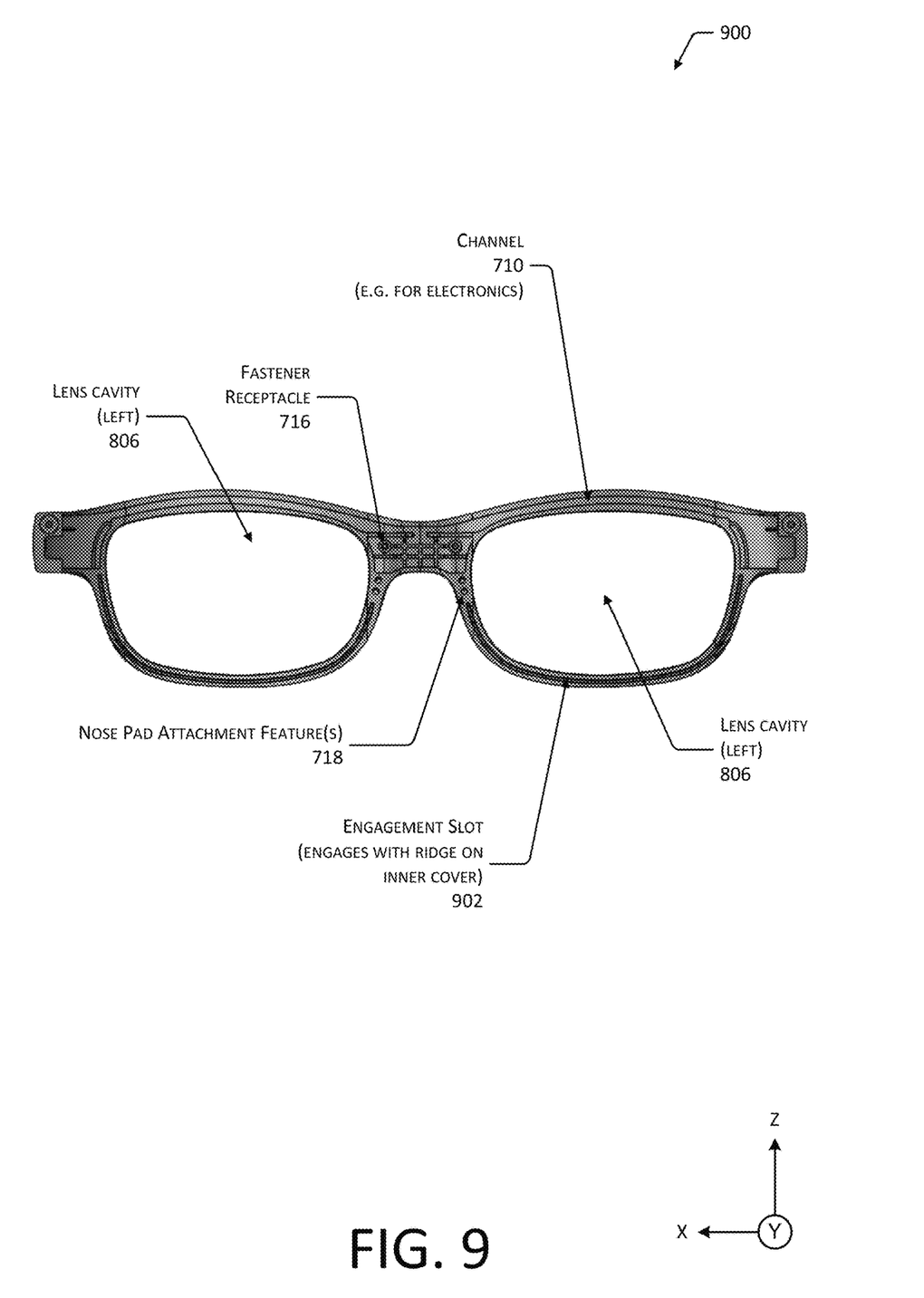
FIG. 9 depicts a view of the front frame depicted in FIG. 6, according to one implementation.

FIG. 9 depicts a rear view 900 of the front frame 602 depicted in FIG. 6, according to one implementation. In this view, several of the previously described features of the front frame 602 are depicted. Each lens cavity 806 may be bounded at least in part by a frame groove 708. Also depicted are engagement slots 902 that are arranged along at least a portion of a perimeter of the lens cavities 806. For example, the engagement slot 902 may comprise a recess within the front frame 602 that extends along approximately one half of a lower portion of a perimeter of a lens cavity 806. The inner cover 606 (not shown in this illustration) may include a complementary or corresponding feature such as a tab or ridge that may be inserted into the engagement slot 902 during assembly. In some implementations, an adhesive may be placed within at least a portion of the engagement slot 902 prior to assembly. In other implementations, the front frame 602 may have a ridge or other protruding feature while the inner cover 606 comprises an engagement slot 902. Additional engagement features may be arranged above the lens cavities 806 as well.

Figure 10:
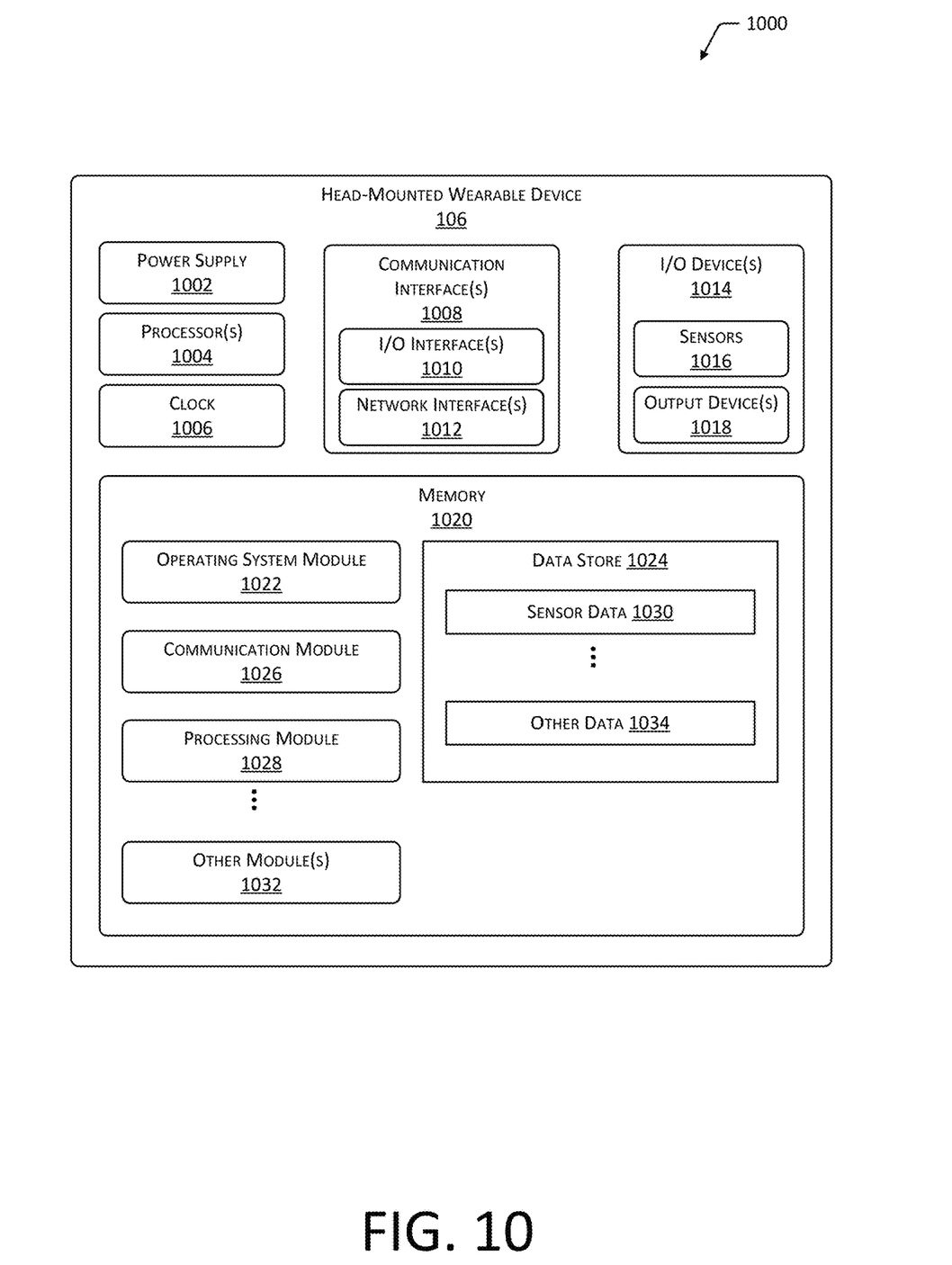
FIG. 10 is a block diagram of electronic components of the head-mounted wearable device, according to some implementations.

FIG. 10 is a block diagram 1000 of components of the head-mounted wearable device 106, according to some implementations.

One or more power supplies 1002 may be configured to provide electrical power suitable for operating the components in the HMWD 106. The one or more power supplies 1002 may comprise batteries, capacitors, fuel cells, photovoltaic cells, wireless power receivers, conductive couplings suitable for attachment to an external power source such as provided by an electric utility, and so forth. For example, the batteries on board the HMWD 106 may be charged wirelessly, such as through inductive power transfer. In another implementation, electrical contacts may be used to recharge the HMWD 106.

The HMWD 106 may include one or more hardware processors 1004 (processors) configured to execute one or more stored instructions. The processors 1004 may comprise one or more cores. The processors 1004 may include general purpose microprocessors, microcontrollers, application specific integrated circuits (ASICs), digital signal processors (DSPs), and so forth. One or more clocks 1006 may provide information indicative of date, time, ticks, and so forth. For example, the processor 1004 may use data from the clock 1006 to associate a particular interaction with a particular point in time.

The HMWD 106 may include one or more communication interfaces 1008 such as input/output (I/O) interfaces 1010, network interfaces 1012, and so forth. The communication interfaces 1008 enable the HMWD 106, or components thereof, to communicate with other devices or components. The communication interfaces 1008 may include one or more I/O interfaces 1010. The I/O interfaces 1010 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1010 may couple to one or more I/O devices 1014. The I/O devices 1014 may include sensors 1016. The sensors 1016 may include but are not limited to, the AC microphone 310, the BC microphone 312, the touch sensor 314, the button 316, a camera, a proximity sensor, a barometer, a light sensor, an inertial measurement unit, a magnetometer, and so forth. The I/O devices 1014 may also include output devices 1018. The output devices 1018 may include but are not limited to display lights, graphical displays, BC transducers 318, haptic output devices, air conduction speakers, and so forth. The display lights may comprise one or more light-emitting diodes, quantum dots, incandescent lamps, electroluminescent materials, and so forth. When activated, a display light emits light. One or more display lights may be positioned within the field of view of the user 102 while the HMWD 106 is worn on the head 104. For example, one or more display lights may be arranged just above one or both lenses 108 of the HMWD 106, such as on the front frame 206 or the front frame 602.

In some embodiments, the I/O devices 1014 may be physically incorporated with the HMWD 106 or may be externally placed. The output devices 1018 are configured to generate signals, which may be perceived by the user 102 or may be detected by sensors 1016.

The network interfaces 1012 may be configured to provide communications between the HMWD 106 and other devices, such as the server 114. The network interfaces 1012 may include devices configured to couple to personal area networks (PANs), wired or wireless local area networks (LANs), wide area networks (WANs), and so forth. For example, the network interfaces 1012 may include devices compatible with Ethernet, Wi-Fi, Bluetooth, Bluetooth Low Energy, ZigBee, and so forth.

The HMWD 106 may also include one or more busses or other internal communications hardware or software that allow for the transfer of data between the various modules and components of the HMWD 106.

As shown in FIG. 10, the HMWD 106 includes one or more memories 1020. The memory 1020 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1020 provides storage of computer-readable instructions, data structures, program modules, and other data for the operation of the HMWD 106. A few examples of functional modules are shown stored in the memory 1020, although the same functionality may alternatively be implemented in hardware, firmware, or as a system on a chip (SoC).

The memory 1020 may include at least one operating system (OS) module 1022. The OS module 1022 is configured to manage hardware resource devices such as the I/O interfaces 1010, the I/O devices 1014, the communication interfaces 1008, and provide various services to applications or modules executing on the processors 1004. The OS module 1022 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1020 may be a data store 1024 and one or more of the following modules. These modules may be executed as foreground applications, background tasks, daemons, and so forth. The data store 1024 may use a flat file, database, linked list, tree, executable code, script, or other data structure to store information. In some implementations, the data store 1024 or a portion of the data store 1024 may be distributed across one or more other devices including servers 114, network attached storage devices, and so forth.

The communication module 1026 may be configured to establish communications with one or more of the computing devices 110, other HMWDs 106, servers 114, sensors 1016, or other devices. The communications may be authenticated, encrypted, and so forth.

The processing module 1028 may use sensor data 1030 to determine user inputs, determine information about the environment around the HMWD 106, and so forth.

During operation of the system the data store 1024 may store the sensor data 1030 or other data at least temporarily, in the data store 1024.

Techniques such as artificial neural networks (ANN), active appearance models (AAM), active shape models (ASM), principal component analysis (PCA), classifiers, cascade classifiers, and so forth, may also be used to process data.

Other modules 1032 may also be present in the memory 1020 as well as other data 1034 in the data store 1024. For example, the other modules 1032 may include a contact management module while the other data 1034 may include address information associated with a particular contact, such as an email address, telephone number, network address, uniform resource locator, and so forth.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A device comprising:
    a front frame having an interior side and an exterior side, the front frame comprising:
        a left lens cavity bounded by a first frame groove;
        a right lens cavity bounded by a second frame groove;
        a sensor cavity that opens to the interior side;
        a channel that opens to the interior side; and
        a passage that connects the channel and the sensor cavity; and
    an inner cover that covers at least a portion of one or more of: the sensor cavity, or the channel, when the inner cover is assembled to the interior side of the front frame.

2. The device of claim 1, wherein the front frame comprises a unitary piece of plastic formed using injection molding and further wherein the first frame groove and the second frame groove are formed using a collapsible insert.

3. The device of claim 1, wherein the inner cover includes an air conduction microphone port through the inner cover.

4. The device of claim 1, further comprising one or more mechanical fasteners that join the inner cover to the front frame.

5. The device of claim 1, the front frame further comprising a first engagement slot arranged around at least a portion of a perimeter of the left lens cavity and a second engagement slot arranged around at least a portion of a perimeter of the right lens cavity; and
the inner cover further comprising:
a left engagement ridge for insertion into the first engagement slot; and
a right engagement ridge for insertion into the second engagement slot.

6. The device of claim 1, further comprising:
a left lens that is retained within the left lens cavity by edges of the first frame groove; and
a right lens that is retained within the right lens cavity by edges of the second frame groove.

7. The device of claim 1, further comprising one or more of an air conduction microphone or a bone conduction microphone arranged within the sensor cavity.

8. The device of claim 1, the device further comprising:
a left hinge mounted to the front frame;
a right hinge mounted to the front frame; and
the inner cover further, when assembled to the interior side of the front frame, covers at least a portion of the left hinge and the right hinge.

9. The device of claim 1, wherein the front frame comprises one or more engagement slots and the inner cover comprises one or more ridges that fit within the one or more engagement slots; and
further comprising adhesive arranged within at least a portion of the one or more engagement slots when assembled.

10. The device of claim 1, wherein the front frame comprises one or more mechanical interference fit elements that mechanically engage one or more complementary mechanical interference fit elements of the inner cover.

11. A device comprising:
a first portion of a left lens frame joined to a left portion of a frame bridge;
a first portion of a right lens frame joined to a right portion of the frame bridge;
wherein the frame bridge includes:
a left lower lens retention feature;
a right lower lens retention feature;
a mounting feature; and
a sensor cavity that opens to an interior side;
a left upper lens retention feature at a second portion of the left lens frame, wherein the left upper lens retention feature is adjacent to the left lower lens retention feature when the device is assembled; and
a right upper lens retention feature at a second portion of the right lens frame, wherein the right upper lens retention feature is adjacent to the right lower lens retention feature when the device is assembled.

12. The device of claim 11, the left lower lens retention feature and the left upper lens retention feature comprising a first pair of complementary mechanical interference fit elements to engage one another to maintain the left lower lens retention feature and the left upper lens retention feature adjacent to one another when assembled; and
the right lower lens retention feature and the right upper lens retention feature comprising a second pair of complementary mechanical interference fit elements to engage one another to maintain the right lower lens retention feature and the right upper lens retention feature adjacent to one another when assembled.

13. The device of claim 11, wherein the left lower lens retention feature comprises a first boss having a first threaded hole in the left lower lens retention feature and the left upper lens retention feature comprises a second boss having a first unthreaded hole, and further wherein the right lower lens retention feature comprises a third boss having a second threaded hole in the right lower lens retention feature and the right upper lens retention feature comprises a fourth boss having a second unthreaded hole.

14. The device of claim 11, the frame bridge further comprising:
a first mounting hole through the frame bridge;
a second mounting hole through the frame bridge; and
a bridge cover to cover the frame bridge, the bridge cover including:
a third mounting hole to align with the first mounting hole for assembly; and
a fourth mounting hole to align with the second mounting hole for assembly.

15. The device of claim 11, wherein the mounting feature of the frame bridge comprises one or more holes through the frame bridge.

16. The device of claim 11, wherein the left lens frame, the right lens frame, and the frame bridge comprise a unitary piece of material.

17. The device of claim 11, wherein the frame bridge is shaped to provide clearance for a microphone package to be included in the sensor cavity.

18. The device of claim 11, further comprising:
a bridge cover affixed to the frame bridge using one or more of an adhesive, a mechanical interference fit feature, or a fastener, wherein the bridge cover includes an air conduction microphone port through the bridge cover and the bridge cover covers at least a portion of the frame bridge.

19. The device of claim 11, further comprising:
a left lens comprising a first edge groove around a perimeter of the left lens;
wherein the left lens is retained by disposition of at least a portion of the left lens frame within at least a portion of the first edge groove;
a right lens comprising a second edge groove around a perimeter of the right lens; and
wherein the right lens is retained by disposition of at least a portion of the right lens frame within at least a portion of the second edge groove.

20. The device of claim 11, wherein the left upper lens retention feature, the left lower lens retention feature, the right upper lens retention feature, and the right lower lens retention feature are perpendicular to a plane described by a lower frame bridge; and further wherein the left lower lens retention feature is threaded and the right lower lens retention feature is threaded.

* * * * *